United States Patent [19]

Saimi et al.

[11] Patent Number: 4,507,766

[45] Date of Patent: Mar. 26, 1985

[54] OPTICAL DEVICE FOR OPTICALLY RECORDING AND REPRODUCING INFORMATION SIGNALS ON AN INFORMATION CARRIER

[75] Inventors: Tetsuo Saimi, Hirakata; Keiichi Yoshizumi, Osaka, both of Japan

[73] Assignee: Matsushita Electric Industrial Co., Ltd., Osaka, Japan

[21] Appl. No.: 397,451

[22] Filed: Jul. 12, 1982

[30] Foreign Application Priority Data

Jul. 16, 1981 [JP] Japan .................. 56-112472

[51] Int. Cl.³ ........................... G11B 7/12
[52] U.S. Cl. ..................... 369/45; 250/201; 369/44; 369/46; 369/110
[58] Field of Search .......... 369/44, 45, 46, 117, 369/110; 250/201; 350/247, 255

[56] References Cited

U.S. PATENT DOCUMENTS 3,962,688 6/1976 Westerberg .................. 369/44
4,408,314 10/1983 Yokota ......................... 369/46

FOREIGN PATENT DOCUMENTS 129940 10/1980 Japan ........................ 369/45

*Primary Examiner*—Raymond F. Cardillo, Jr.
*Assistant Examiner*—Paul Stefanski
*Attorney, Agent, or Firm*—Stevens, Davis, Miller & Mosher

[57] ABSTRACT

An optical device for optically recording and reproducing information in and out of a recording medium. The device consists of a movable optical system which carries out at least two-dimensional movements and a stationary optical system. The movable optical system includes a beam splitter adapted to receive a parallel light beam, an objective lens for focussing the light beam from the second beam splitter onto the medium and a photodetector disposed in the vicinity of the beam splitter and adapted to receive, through the objective lens and the beam splitter, the light beam reflected by the information carrier. The stationary optical system includes a beam splitter for directing the parallel light beam from the source to the beam splitter of the movable optical system and a photodetector for receiving the reflected light beam coming through the beam splitter. The photodetector of the movable optical system provides at least a tracking control signal while the photodetector of the stationary optical system provides at least a focussing control signal.

5 Claims, 5 Drawing Figures

OPTICAL DEVICE FOR OPTICALLY RECORDING AND REPRODUCING INFORMATION SIGNALS ON AN INFORMATION CARRIER

BACKGROUND OF THE INVENTION

The present invention relates to an optical device suitable for optically recording an information signal on an information carrier or optically reproducing an information signal on the information carrier by means of a ray beam emitted from a ray beam source.

In optical recording or reproduction of information into and out of an information carrier (photo-disc), the ray beam from a ray source is applied to a lens system (objective lens) adapted to converge the ray beam and optimize the same for the recording or reproduction within the diffraction limit of the objective lens. The dimensions of the ray beam spot is determined by the number NA of apertures of the objective lens and the wavelength λ of the incident ray beam. More specifically, the dimensions of the ray beam spot is approximated by λ/NA. For instance, assuming that the ray source is a semiconductor laser beam source of a wave length λ of 0.8 μm and that the number NA of apertures of the objective lens is 0.6, the dimension of the beam spot is calculated to be about 1.3 μm.

The information signal which is to be recorded or reproduced by such a fine beam spot has the form of a pit having a breadth of 0.4 to 0.8 μm and a length of 0.5 to 2 μm. In order to record or reproduce such a pit-like signal, it is necessary to employ a focussing servo system for controlling the focal point of the beam spot, as well as a tracking servo system for correctly applying the ray beam to the information signal track. In some cases, it is necessary to adopt a time base correction (TBS servo) which is adapted to shift the beam spot in the direction of the track to compensate for any fluctuation of signal frequency in relation to time attributable to a fluctuation in the rotation speed of the disk or the like.

These servo systems should have extremely high precision. For instance, the focussing servo system is required to have a dynamic range in the order of several hundreds of microns at an allowance of ±1 μm, while the tracking servo system has to have a dynamic range of ±100 μm or greater at an allowance of ±0.1 μm. The TBS servo system requires a dynamic range substantially equivalent to that of the tracking servo system.

For realizing such servo system of high precision, it is necessary to use a small-sized and light-weight optical pickup capable of moving two-dimensionally or three dimensionally. The construction and operation of a typical optical pickup will be explained hereinunder with reference to the accompanying drawings.

SUMMARY OF THE INVENTION

Before turning to the description of invention, a brief explanation will be made as to the prior art, in order to clarify the problem inherent in the prior art and, hence, to facilitate the understanding of the invention.

Figure 1:
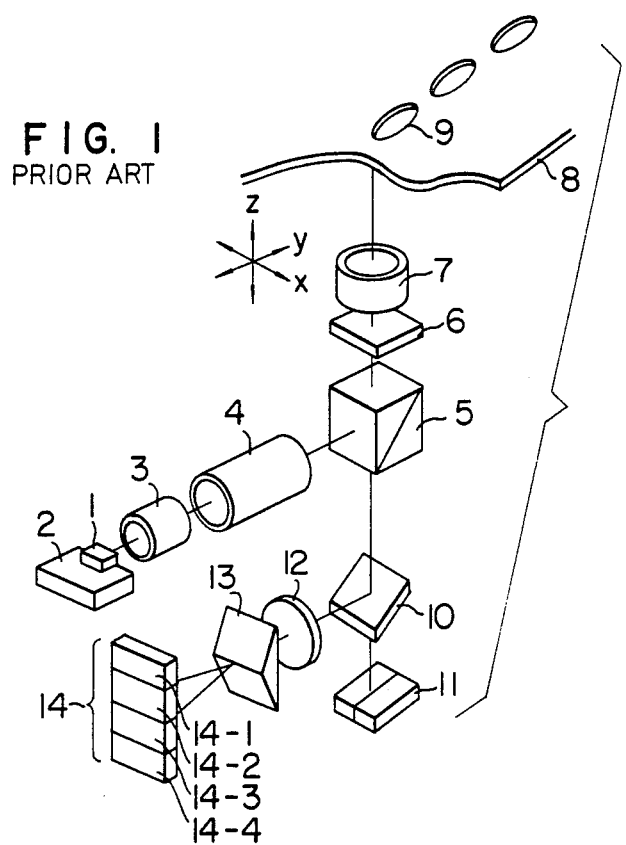
FIG. 1 shows the construction of an example of conectional optical recording/reproducing device.

FIG. 1 is a schematic exploded perspective view of an optical pickup composed of various known optical components. A ray beam emitted from a semiconductor laser 1 on a heat sink 2 is changed into a parallel beam as it passes through a coupling lens 3. If the beam emitted from the semiconductor laser 1 has an anisotropy, a beam expander system 4 is used to turn the parallel beam into an isotropic one. The parallel beam applied to a polarization beam splitter 5 is reflected upwardly as viewed in the drawings and is made to pass through a quarter-wave plate 6. The beam is then converged by an objective lens 7 and is applied to the information signal 9 on a photo-disc 8. The beam reflected by the photo-disc 8 is then transmitted through the objective lens 7 and the quarter-wave plate 6 and is then introduced to a half mirror 10 through the polarization beam splitter 5. The beam component which has passed through the half mirror 10 is applied to a photodetector 11 which is split into two halves in the direction of the information track. Meanwhile, the beam component which is reflected by the half mirror 10 is made to pass through a single convexed lens 12 converged and is spread two-dimensionally so as to be applied to an array 14 of photodetectors located in the focal plane of the convexed lens 12. In this conventional system, only the objective lens 7 is allowed to move three-dimensionally, i.e. in the directions of arrows x, y and z. The objective lens 7 is adapted to be driven in the directions of arrows x, y and z by a tracking control signal, TBC control signal and a focussing control signal, respectively. The mechanism for the driving is not described here because such mechanism does not directly relate to the invention of this application.

In this optical system, the tracking control signal is derived from the photodetector 11. Namely, the beam spot focussed by the objective lens is diffracted by the information signal track in the direction perpendicular to the track, so that the beam applied to the photodetector 11 involves a signal component which depends on the oscillation of track (amount of movement in the direction perpendicular to the track). It is, therefore, possible to obtain a tracking control signal by means of a differential circuit into which are introduced electric signals from respective segments of the split type photodetector 11.

Figure 2:
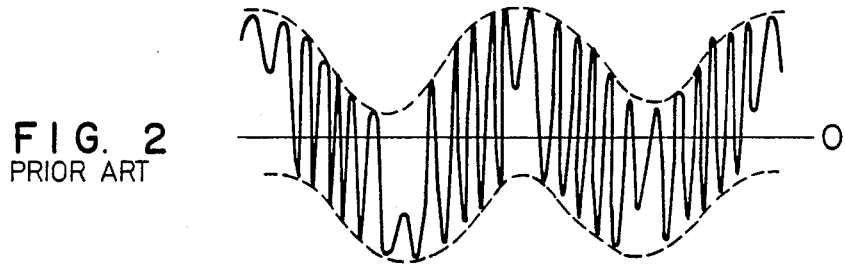
FIG. 2 is a waveform chart for explaining the operation of the device shown in FIG. 1.

The focussing control signal is obtained from the array 14 of the photodetectors. Assuming here that two beams emitted from the biprism 13 direct the boundary line between the detectors 14-1 and 14-2 and the boundary line between the detectors 14-3 and 14-4, while the beam spot focussed by the objective lens 7 is just on the information signal 9, the outputs from the detectors 14-2 and 14-3 are increased when the objective lens 7 and the photodisc 8 approach each other, whereas, when the objective lens 7 and the photodisc 8 get away from each other, the outputs from the detectors 14-1 and 14-4 are increased. It is, therefore, possible to obtain a focussing control signal of so-called Foucault method, by treating the electric signals from the detectors 14 by means of a differential circuit which is adapted to make a calculation of (14-1)+(14-4)−(14-2)−(14-3). This known optical system involves a serious problem. Namely, the tracking control is impractically unstable in this optical system. More specifically, a tracking control signal having a winding envelope as shown in FIG. 2 is produced when the optical pickup is driven by the focussing control while effecting no control in the tracking direction (x direction). This is attributable to the fact that the beam is undesirably moved due to a natural oscillation of the objective lens 7 in the direction perpendicular to the track. Therefore, if the amount of movement of the objective lens in the direction perpendicular to the objective lens is increased, the change in the envelope of the tracking control signal shown in FIG. 2 is further increased to such an extent as to eliminate the zero-cross point of the control signal. In such a case, it is not possible at all to effect the tracking control.

Under this circumstance, the present invention aims as its primary object at providing an optical pickup which can be controlled stably, thereby to overcome the above-described problem inherent in the conventional optical pickup.

To this end, according to one aspect of the invention, there is provided an optical device comprising: a movable optical system at least two-dimensionally and including a second beam splitter adapted to receive a parallel ray beam, an objective lens adapted for focussing the ray beam from the second beam splitter onto an information carrier and a second photodetector disposed in the vicinity of the second beam splitter and adapted to receive, through the objective lens and the second beam splitter, the ray reflected by the information carrier; and a stationary optical system including a first beam splitter adapted to apply the parallel beam from a source to the second beam splitter while receiving the reflected ray coming through the second beam splitter and a first photodetector adapted to receive the reflected ray coming through the first beam splitter.

The above and other objects, features and advantages of the invention will become clear from the following description of the preferred embodiments taken in conjunction with the accompanying drawings.

DESCRIPTION OF THE PREFERRED EMBODIMENTS

Figure 4:
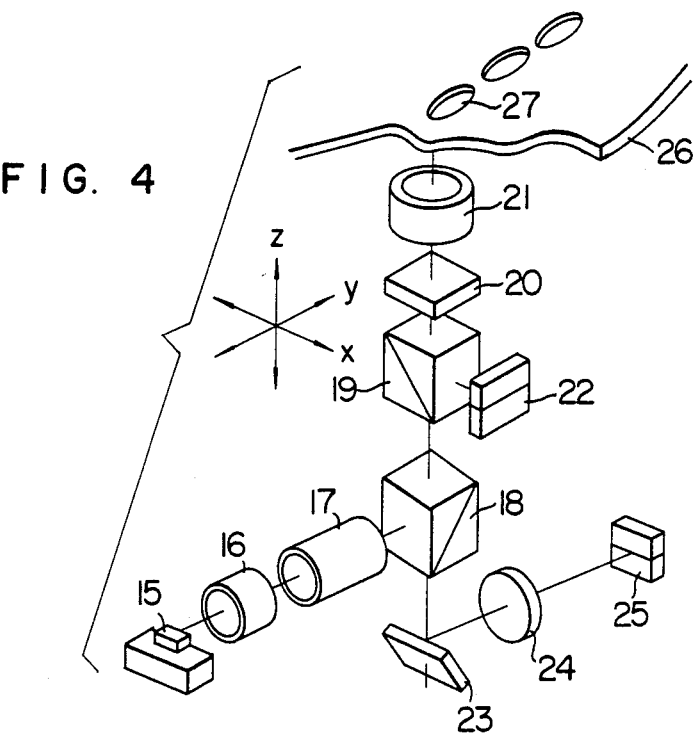
FIG. 4 shows the construction of an optical recording/reproducing device in accordance with an embodiment of the invention.

Referring first to FIG. 4 showing an optical device in accordance with a first embodiment of the invention, a semiconductor laser 15 emits a ray beam which is changed into a parallel beam as it passes a coupling lens 16. A beam expander system 17 is used as necessitated in order to obtain isotropy of the beam as required. The parallel beam is reflected upwardly as viewed in the drawings by a first polarization beam splitter 18, and is introduced to an objective lens 21 through a second polarization beam splitter 19 and a quarter-wavelength plate 20. The beam is then converged by the objective lens 21 and is applied to information signal 27 on a photo-disc 26. The beam reflected upon the photo-disc is then introduced through the objective lens 21 and the quarter-wavelength plate 20 to a second polarization beam splitter 19 and is spread by the latter. About 10 to 90% of the beam is reflected and applied to a second photodetector 22.

More specifically, the second polarization beam splitter 19 is adapted to transmit the whole part of the beam when the beam is of P polarization wave, i.e. when the electric field of the beam is oriented in the x direction, whereas, when the beam is of S polarization wave, i.e. when the electric field vector of the beam is oriented in the y direction, the second polarization beam splitter reflect more than 10% but less than 90% of the beam. When the information signal is picked up from a photodetector 22 as in the preferred form of the second embodiment which will be described later, more than 60% but less than 80% of the beam is reflected by the second polarization beam splitter 19. The part of the beam transmitted through the second polarization beam splitter 19 is then made to pass through the first beam splitter 18 and is then reflected by a mirror 23 which is adapted to total-reflect almost a half of the beam impinging thereon. The reflected beam is then converged by a converging lens 24 and is applied to the boundary line between the two segments of the split type first photodetector 25. This first photodetector is positioned at the focal point of the converging lens 24, and is composed of two segmentary photodetecting elements having a boundary line extending in the direction coinciding with the direction of splitting of the beam by the total-reflecting mirror 23. It is possible to obtain, through this first photodetector 25, a focussing control signal in accordance with the Houco method as explained before in connection with the prior art.

The beam focussed on the first photodetector 25 takes a position conjugate with the point of emission of ray beam from the semiconductor laser 15, so that this position is fixed against two-dimensional or three-dimensional movement of the movable optical system constituted by the objective lens 21, quarter-wavelength plate 20 and the polarization beam splitter 19. It is, therefore, possible to obtain an ideal focussing control signal devoid of any false signal.

On the other hand, the second photodetector 22 incorporated in the movable optical system is composed of two segmentary elements which are in symmetry with each other with respect to the optical axis. The boundary line between these segmentary elements is disposed in parallel with the information track.

The essential feature of the invention resides in that a photodetector is provided in each of the two or three-dimensionally movable integral optical system including the aforementioned parts 19, 20, 21 and 22 and the stationary optical system which is composed of the semiconductor laser 15, coupling lens 16, beam expander 17, polarization beam splitter 18, total-reflection mirror 23, lens 24 and the first photodetector 25. According to this arrangement, it is possible to obtain a stable tracking control signal from the second photodetector 22 in the movable optical system while obtaining a stable focussing control signal from the first photodetector 25 in the stationary optical system. The reason why the stable tracking control signal is obtained from the second photodetector in the movable optical system is that the shape of the beam on the second photodetector is not changed substantially in response to the movement of the movable optical system in the tracking direction, i.e. in the direction of x-axis in FIG. 4.

Figure 3:
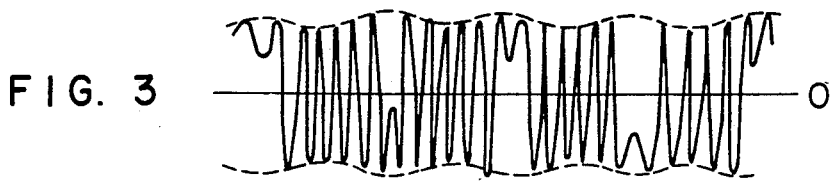
FIG. 3 is a waveform chart for explaining the operation of a device in accordance with the invention.

FIG. 3 shows a track control system which is obtained when the focussing control is made by the optical pickup of the invention while a forcible periodic driving is made in the open state in the direction of tracking. From the comparison between the signals shown in FIG. 2 and FIG. 3, it will be seen that the invention provides a control signal of better quality as compared with the signal obtained with the conventional optical pickup. The slight winding of the envelope of the signal shown in FIG. 3 is attributable to an uneven distribution of the ray beam.

The optical device of the embodiment described hereinbefore is not exclusive and can be varied in various forms.

For instance, in place of the optical system shown in FIG. 4 in which the ray beam from the semiconductor laser 15 is reflected by the first polarization beam splitter 18, it is possible to use an optical system in which the ray beam is transmitted through the polarization beam splitter 18. Such an arangement is obtained by substituting the combination of the semiconductor laser 15, coupling lens 16 and the beam expander system 17 and the combination of the lens 24 and the first photodetector 25 with each other.

Figure 5:
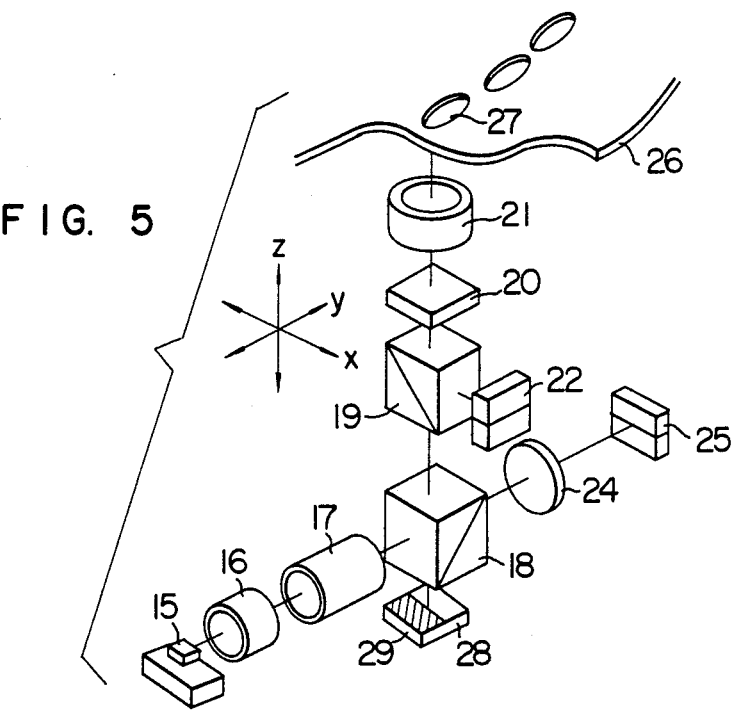
FIG. 5 shows the construction of an optical recording/reproducing apparatus in accordance with another embodiment of the invention.

In the optical device of the invention, the stationary optical system can have a more planar form as in a second embodiment of the invention which will be described hereinunder with reference to FIG. 5. In the optical device of the second embodiment, a ray beam obtained through an amplitude-division of the ray beam reflected by the photo-disc 26 passes through the first polarization beam splitter 18 as in the case of the first embodiment. In this second embodiment, however, the amplitude-divided ray beam is applied to a second quarter-wavelength plate 28 the reverse side of which constitutes a total-reflection mirror. The ray beam is then reflected and applied again to the first polarization beam splitter 18. The beam is then reflected by the beam splitter 18 and is applied through the single convexed lens 24 to the first photodetector 25 which is positioned on the focal plane of the lens 24. A light absorption element or an element 29 which does not permit the transmission of light therethrough is disposed so that a part of the beam is not reflected by the second quarter-wavelength plate. It will be understood that, by the use of this element 29, it is possible to obtain the focussing control signal according to Houco method described before.

It is possible to effect a fine adjustment of the focussing control by rotating the reflecting mirror 23 or the second quarter-wavelength plate in the x direction. It is generally known to effect the fine adjustment in the Foucault method by finely displacing the photodetector 25 in the z direction. The mechanism for displacing the photodetector, however, is generally complicated and unstable. According to the method of the invention, the fine adjustment can be effected simply and stably by finely rotating the plane such as reflecting mirror.

As has been described, according to the invention, it is possible to obtain quite a stable optical pickup by an arrangement such that each of the movable optical system and stationary optical system are provided with a photodetector and that at least the tracking control signal is derived from the photodetector of the movable optical system and at least the focussing control signal is derived from the photodetector in the stationary optical system.

Although the invention has been described through specific preferred forms, the described embodiments are not exclusive and various changes and modifications may be imparted thereto without departing from the scope of the invention which is limited solely by the appended claims.

What is claimed is:

1. An optical device for irradiating a parallel light beam from a light beam source onto an information carrier and receiving a reflected light beam from said information carrier so as to optically record and reproduce signals on said information carrier, including:

a stationary optical system for guiding said parallel light beam from said light beam source along a first optical axis and deflecting said light beam along said first optical axis so as to redirect said light beam along a second optical axis; and a movable optical system carrying out at least a two-dimensional movement, for irradiating said light beam from said stationary optical system along said optical axis onto said information carrier, and receiving said reflected light beam so as to guide the latter along said second optical axis and as well to deflect said reflected light in part to redirect the same along a third optical axis;

said stationary optical system comprising: a first beam splitter for deflecting said light beam along said first optical axis so as to redirect said light beam along said second optical axis and to allowing said reflected light beam along said second optical axis to pass therethrough and reach a first photodetector; and said movable optical system comprising: a second beam splitter for allowing said light beam from said first beam splitter and said reflected light beam from said information carrier to pass therethrough along said second optical axis, and deflecting said reflected light beam from said information carrier so as to redirect said reflected light beam in part along a third optical axis to a second photodetector disposed proximate to said second beam splitter, and an objective lens for focussing said light beam from said second beam splitter along said second optical axis onto said information carrier and guiding said reflected light beam from said information carrier along said second optical axis, to said second beam splitter.

2. An optical device according to claim 1, wherein said second photodetector comprises segmentary elements arranged in symmetry with each other with respect to said third optical axis, the boundary line between said segmentary elements extending in parallel with an information track in said information carrier, said second photodetector being adapted to produce at least a tracking control signal for making a follow-up control of the information track.

3. An optical device according to claim 1, wherein said beam splitter is a polarization beam splitter while said second beam splitter is adapted to reflect 10 to 90% of an S polarization beam while almost fully transmitting the P polarization beam, said movable optical system further comprising a quarter-wavelength plate interposed between said second beam splitter and said objective lens.

4. An optical device according to claim 1, wherein a part of the reflected light beam from said information carrier, passed through said second beam splitter and then through said first beam splitter, is applied to a second quarter-wavelength plate and is then reflected by a total-reflecting mirror provided on the reverse side or rear side of said second quarter-wavelength plate adapted to reflect at least a part of the reflected light beam, the part of the light beam reflected by said total reflection mirror being emitted through said first beam splitter and utilized as the control signal for controlling the focussing of said light beam irradiated onto said information carrier.

5. An optical device according to claim 4, further comprising means for permitting said total reflecting mirror to carry out a fine rotational movement in at least one plane to effect a fine adjustment of focussing of said ray beam onto said information carrier.

* * * * *